United States Patent [19]

Eason et al.

[11] Patent Number: 5,123,829

[45] Date of Patent: Jun. 23, 1992

[54] ROD GUIDE REMOVER

[75] Inventors: Ronald D. Eason, Fritch; James S. Dowell, Borger, both of Tex.

[73] Assignee: J. M. Huber Corporation, Rumson, N.J.

[21] Appl. No.: 714,465

[22] Filed: Jun. 13, 1991

[51] Int. Cl.⁵ .......................... B26D 3/00; B26D 7/02
[52] U.S. Cl. .................................... 425/306; 83/465; 83/613; 83/639.1; 83/924; 29/236
[58] Field of Search ............... 425/289, 295, 306, 316; 83/924, 456, 465, 466, 870, 639.1, 613, 455; 29/236

[56] References Cited

U.S. PATENT DOCUMENTS

| 3,234,838 | 2/1966 | Faull | 83/465 |
| 4,169,400 | 10/1979 | Ducret | 83/924 |

Primary Examiner—Willard Hoag
Attorney, Agent, or Firm—Alec H. Horn; Harold H. Flanders; Robert L. Price

[57] ABSTRACT

A rod guide remover is provided for splitting rod guides away from a sucker rod without risk of damage to the rod. A set of opposing blades are used which are kept a selected distance apart by stop members that abruptly contact a set of rod supports for preventing injury to the rod. The gap distances are selected over a relatively narrow range to insure complete splitting of all types of guides yet provide sufficient tolerance to protect the rod.

4 Claims, 2 Drawing Sheets

ROD GUIDE REMOVER

BACKGROUND OF THE INVENTION

This application relates to tools for removing molded-on polymeric rod guides from sucker rods and, more particularly, to tools for cutting off guides without harming the rod.

In typical oil field situations, a sucker rod reciprocates within a tubing to actuate a pump for the production of well fluids. These rods are often protected from wear by a plurality of polymeric rod guides affixed about the rod at selected locations. When these rod guides become worn or damaged and need to be replaced, it becomes necessary to remove the molded guide from the rod. Many manual techniques are employed to remove these guides. A large hammer, striking a glancing blow across a rib of the guide, may sometimes dislodge and shatter the polymeric guide if done properly. Unfortunately, this takes practice and sometimes results in damaging dents to the rod surface or the requirement of repeated blows to dislodge the guide in pieces. Alternatively, a chisel may be set at a steep angle to the rod and gently hammered or "walked" axially down the length of the guide to cut a deep groove to aid in the hammering off of the guide. This technique sometimes results in striking of the rod with the cutting chisel and severe damage to the rod.

These techniques are very slow and laborious and unnecessarily increases the manpower necessary for operation of an otherwise highly automated rod guide removal and installation process. For a description of modern rod guide molding practice see U.S. Pat. No. 4,088,184 to Carson and U.S. Pat. No. 4,877,386 to Hinds et al, which are hereby incorporated by reference.

SUMMARY OF THE INVENTION

It is an object of the present invention to provide a tool for removing polymeric rod guides from a rod without risk of damage to the surface of the rod.

It is another object of the present invention to provide a tool which uniformly removes a rod guide from a rod irrespective of the polymeric makeup of the guide so that the operator need make no adjustments as the polymer composition of the guides is changed.

It is yet another object of the present invention to provide a tool whereby the surface of the rod cannot be damaged if the polymer is soft and must be cut deeply to be removed or if the polymer is brittle and shatters suddenly during the removal process.

DESCRIPTION OF THE PREFERRED EMBODIMENT OF THE INVENTION

Figure 1:
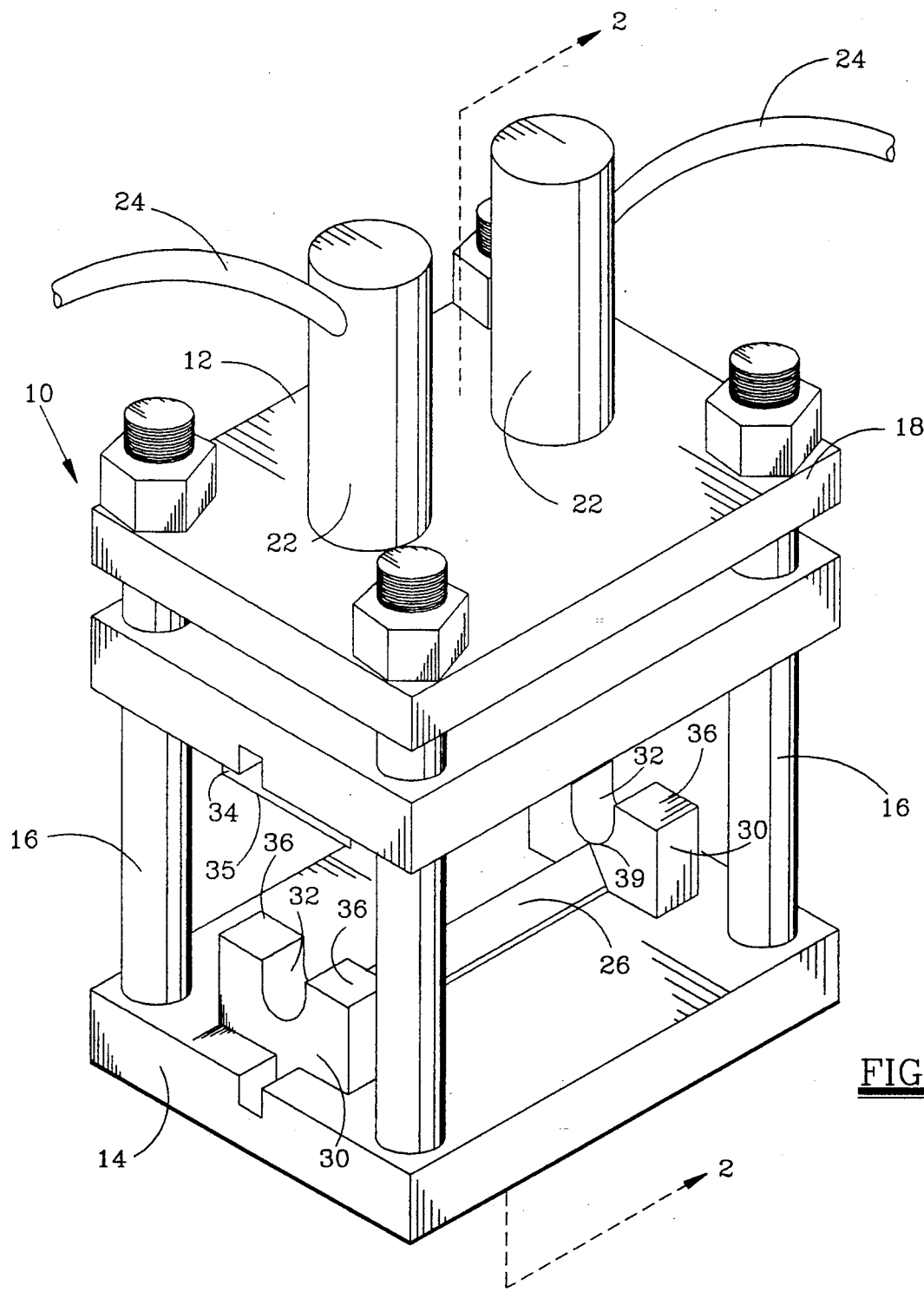
FIG. 1 is an isometric view of a tool of the present invention.
Figure 3:
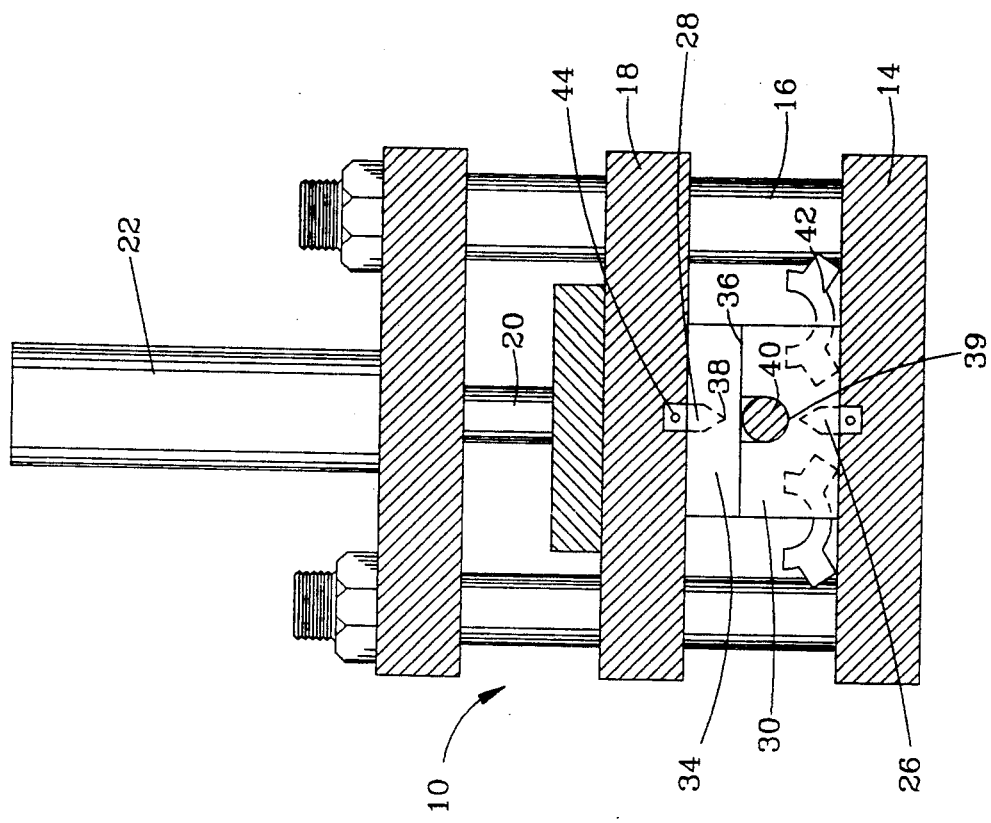
FIG. 3 is an end view taken along line 2—2 of FIG. 1 showing the tool in the actuated and closed position.
Figure 2:
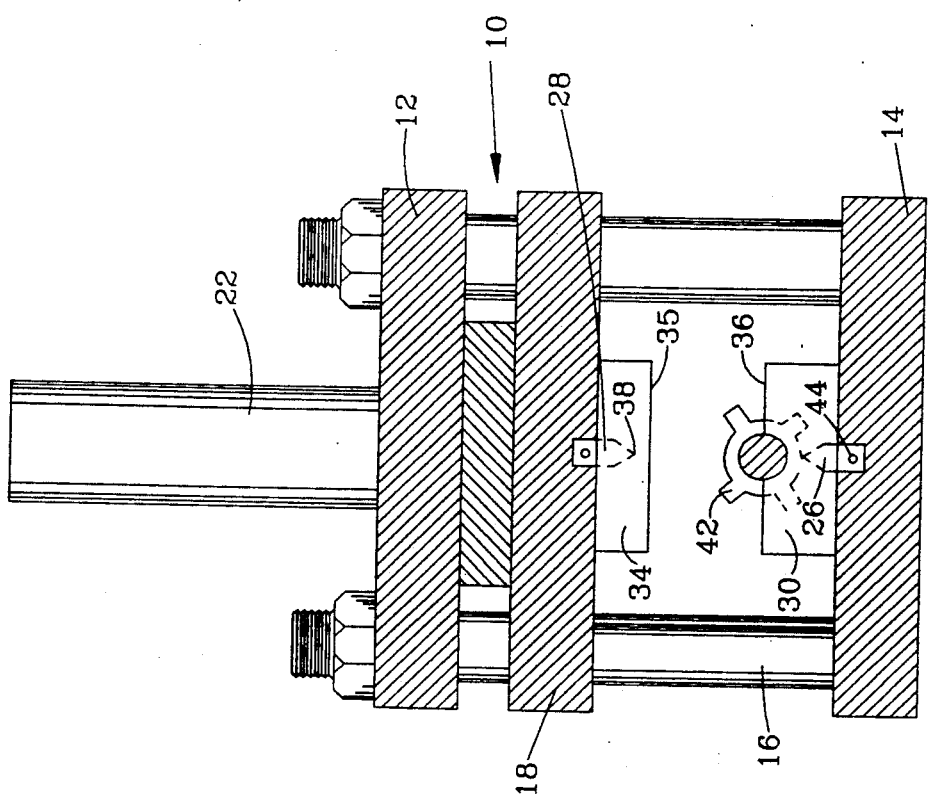
FIG. 2 is an end view taken along line 2—2 of FIG. 1 showing the tool in the open and ready position.

Referring now to FIGS. 1, 2 and 3 there may be seen a rod guide remover of the present invention. A substantially rigid frame (10) is provided which includes a base (14) and a top plate (12) rigidly held a fixed distance apart by a plurality of side supports (16). A travel plate (18) is disposed between the top plate (12) and base (14) and configured so as to permit the side supports (16) to pass through the plate (18) so that the travel plate (18) may slide along the side supports (16) in a solid and controlled manner. An actuator (20) is provided in the form of one or more pushrods passing through the top plate (12) and conveniently attached to the travel plate to move the travel plate along the side supports. This actuator may be powered manually, if desired, (e.g. by the blow of a hammer) but, alternatively, it is more preferred that a power mechanism, such as a plurality of conventional hydraulic or air cylinders (22) attached to a compressor (not shown) by fluid hoses (24), be connected between the frame (10) and the pushrods. In this way activation of the hydraulic cylinders will cause the actuator to force the travel plate (18) up toward the top plate or down toward the base along the side supports (16).

A stationary, base cutting blade (26) is removably mounted on the base (14) between rod supports (30). Each rod support has a rod detent (32) for supporting therein a rod (40) which has molded thereon a rod guide (42) to be removed. These rod supports (30) act to align the axis of the rod with the bottom cutting blade (26) and secure the rod guide in position during operation.

A plurality of stop members (34) are removably mounted on the travel plate (18) between the travel plate and the base (14) and positioned so as to contact surface (35) contact the engagement surfaces (36) of the rod supports (30) when the actuator forces the travel plate (18) to its maximum downward position. This contact abruptly stops the baseward movement of the travel plate.

A top travel blade (28) is mounted on the travel plate (18) between the stop members (34) so as to complement and oppose the base cutting blade (26). In operation, a rod (40) bearing a rod guide (42) to be removed is placed within the detents (32) of rod supports (30) with the rod guide (42) resting upon the base cutting blade (26). It should be noted that the height of the cutting edge of blade (26) is about between 0.031 and 0.25 inches lower than the bottom of rod detente (32) to establish a selected gap (39). Likewise, the cutting edge of blade (28) is about 0.031 and 0.25 inches higher than the contact surface of stop member (34) to establish a selected gap (38). Accordingly it is apparent that the rod (40) is within the detent (32) but not touching the bottom of the detent because the rod guide is support by the base blade (26).

It may now be seen that when the actuator (20) is activated either by a blow of a hammer or hydraulic cylinders (22), the travel plate, carrying the top travel plate blade, slides down the side supports (16) and the travel blade (28) engages the top of rod guide (42). Since rod guide (42) is resting upon base cutting blade (26) as the blades (28) and (26) come together, the guide is split and breaks away.

As mentioned earlier, it is preferred that the stop members, rod supports and blades be easily removable for exchange to adjust for differing rod diameters. This may be accomplished by securing the easily exchangable parts in place with set screws (44).

It is a feature of the present invention that a stop member (34) strikes an engagement surface (36) of a rod support (30) which stops the baseward movement of the travel blade before its cutting edge can come in contact with the rod. Similarly, because the base blade (26) is lower than the bottom of the rod detent (32), the rod is prevented from contacting the base blade (26) by positive engagement of the rod with the bottom of rod detente (32). Accordingly, under no circumstances can the rod be contacted and damaged by either top or base blade. If the rod guide is a softer material, e.g. nylon or polyethylene, the blades will cut almost to their maximum closure distance before the guide splits apart. On the other hand, if the rod guide is composed or a more brittle material, e.g. a polyphenylsulfide/glass fiber composite, the guide will shatter early in the downward cutting motion. In either event, the rod is protected.

The foregoing description of the invention is explanatory only in that changes in the details of the construction illustrated may be made by those skilled in the art within the scope of the appended claims without departing from the spirit of the invention.

We claim:

1. An apparatus for removing polymeric rod guides from a sucker rod, the apparatus comprising:

a rigid frame including a base, a top plate and a plurality of side supports spacing the top plate from the base;

a traveling plate, slidably mounted on the frame and positioned between the base and top plate for slidable movement of the travel plate along the frame between the top plate and base;

a plurality of stop members mounted on the baseward side of the travel plate and having a first cutting blade mounted therebetween, each stop member having a contact surface;

a plurality of rod supports mounted on the top plate side of the base and having a stationary second cutting blade mounted therebetween opposing and substantially co-planar with the first cutting blade, each rod support positioned between a stop member and the base and having an engagement surface for positively contacting a contact surface of a stop member to prevent further baseward movement of the travel plate and first cutting blade, each rod support having a detent for receiving and aligning a sucker rod and rod guide with the first and second cutting blades;

a selected first gap distance between the edge of the first cutting blade and the contact surface of a stop member; and a selected second gap distance between the edge of the second cutting surface and the bottom of the detent of a rod support, whereby when a stop surface is in contact with an engagement surface of a rod support, the first cutting blade is forcibly held a selected first gap distance from the surface of the rod and the second cutting blade is held a selected second gap distance from the surface of the rod.

2. The apparatus of claim 1 wherein the selected first gap distance is between 0.031 and 0.25 inches and the selected second gap distance is between 0.031 and 0.25 inches.

3. The apparatus of claim 1 further comprising an actuator means passing through the frame and connected to the travel plate for forcibly urging the travel plate toward the base.

4. The apparatus of claim 3 wherein the actuator means includes a plurality of pushrods powered by hydraulic cylinders.

* * * * *